3,205,040
PREPARATION OF STABILIZED SULFUR
DICHLORIDE
John H. Schmadebeck, Lewiston, N.Y., assignor to Hooker
Chemical Corporation, Niagara Falls, N.Y., a corporation of New York
No Drawing. Filed Feb. 18, 1963, Ser. No. 259,354
22 Claims. (Cl. 23—205)

This is a continuation-in-part of my co-pending application Serial No. 852,228, filed November 12, 1959, now forfeited.

This invention relates to a method of preparing sulfur dichloride. More particularly this invention also relates to a sulfur dichloride composition stabilized against decomposition.

Sulfur dichloride is used extensively as a chemical intermediate or a reagent in the preparation of organic acid anhydrides, insecticides, rubber cements, rubber substitutes, and lubricant additives.

Sulfur dichloride may be prepared by the chlorination of sulfur, sulfur monochloride, or mixtures thereof. Typical methods are disclosed in United States Patent No. 875,231, issued December 31, 1907, No. 961,530, issued June 14, 1910, and No. 1,341,423, issued May 20, 1920. Sulfur dichloride produced by conventional procedures is generally an equilibrium mixture of sulfur dichloride and sulfur monochloride containing between about sixty-five and eighty percent by weight of the dichloride.

At atmospheric pressure, the boiling point of sulfur dichloride is about fifty-nine degrees centigrade and the boiling point of sulfur monochloride is about one hundred and thirty-eight degrees centigrade. Thus, fractional distillation can be employed to separate sulfur dichloride from sulfur monochloride. However, sulfur dichloride tends to decompose into sulfur monochloride and chlorine at temperatures above about fifty-nine degrees centigrade, and the recovery of pure sulfur dichloride by such a technique is relatively low. In addition, the pure product decomposes upon standing at room temperature in accordance with the equation:

(1) 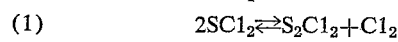
$$2SCl_2 \rightleftharpoons S_2Cl_2 + Cl_2$$

and eventually forms the aforesaid equilibrium mixture.

Chlorine can be dissolved in the equilibrium mixture of sulfur dichloride and sulfur monochloride to produce substantially pure sulfur dichloride. However, this product is also unstable and decomposes upon standing to produce the aforesaid equilibrium mixture. Thus, it can be seen that unless the pure sulfur dichloride is used immediately after it is prepared, there is a significant degradation, and the resultant equilibrium mixture may not give the desired reaction product when subsequently used as a reaction intermediate. It is a common practice in the industry today for one manufacturer to produce the sulfur dichloride and another manufacturer to purchase this reagent and employ it in the production of an intermediate or final product. Generally, a period of several weeks or months passes before the sulfur dichloride produced at one location is used as a reagent at another location. Appreciable deterioration of the sulfur dichloride occurs during this period.

Feher et al., in Zeit Anorg. Alleg. Chemie. vol. 290 (1957), page 305, disclose a method of stabilizing sulfur dichloride with a small amount of phosphorus trichloride. In this method, sulfur monochloride is chlorinated in the presence of a small proportion of iron powder to produce a reaction product containing sulfur dichloride. After adding a small proportion of phosphorus trichloride, the reaction product is rectified and the sulfur dichloride product recovered. The sulfur dichloride thus obtained, after adding a small additional amount of phosphorus trichloride, is stored at a temperature of zero degrees centigrade to inhibit chlorine volatilization. Such a technique has some effect upon stabilizing sulfur dichloride, but is impractical from a commercial standpoint because of the expense involved in refrigerating the sulfur dichloride during transportation and storage.

It is an object of the present invention to provide highly concentrated sulfur dichloride stablized against decomposition.

It is a further object of the invention to provide a method of preparing stabilized sulfur dichloride in highly concentrated form.

Another object of the present invention is to provide a novel stabilizer for sulfur dichloride.

Still another object of the invention is to substantially inhibit the evolution of chlorine from pure sulfur dichloride while stored for extended periods.

A further object of the invention is to improve the yield of sulfur dichloride when distilling sulfur dichloride from a mixture of sulfur dichloride and sulfur monochloride.

These and other objects of the invention will be apparent from the following detailed description of the invention.

It has now been discovered that when a mixture of sulfur dichloride and sulfur monochloride is distilled in the presence of a stabilizing proportion of a sulfur compound of an element of the phosphorus group selected from the group consisting of phosphorus and bismuth to produce a highly concentrated sulfur dichloride product, and the product thus obtained is admixed with an additional stabilizing proportion of the sulfur compound, the resulting sulfur dichloride product is stabilized against chlorine evolution while stored for extended periods, for example, as long as three months.

It has also been found that any sulfur dichloride containing a minor proportion of sulfur monochloride may be treated in accordance with the process of this invention. It is preferred to employ the mixture of sulfur dichloride and sulfur monochloride prepared by the chlorination of sulfur monochloride in the presence of a catalyst, such as ferric chloride, carbon, and the like. Such a mixture generally contains at least about sixty-five percent sulfur dichloride and less than about thirty-five percent sulfur monochloride by weight. However, mixtures of sulfur dichloride and sulfur monochloride prepared by any suitable technique may be employed. Trace amounts of ferric chloride, carbon, and other sulfur chlorides may be present in the mixture. If desired, substantially pure sulfur dichloride may also be stabilized by the technique of the instant invention.

Any sulfur-bearing inorganic compound of an element of the phosphorus group of the Periodic Table selected from the group consisting of phosphorus and bismuth which has a stabilizing effect upon sulfur dichloride can be employed. Typical stabilizing compounds include phosphorus sulphides such as phosphorus pentasulfide ($P_4S_{10}$), phosphorus sesquisulfide ($P_4S_3$), and tetraphosphorus heptasulfide ($P_4S_7$), thiophosphoryl halides such as thiophosphoryl chloride, thiophosphoryl fluoride ($PSF_3$), possibly thiophosphoryl bromide ($PSBr_3$) and possibly thiophosphoryl iodide ($PSI_3$), phosphorus sulfoxide ($P_4O_6S_4$), bismuth sulfide ($Bi_2S_3$), bismuth sulfate ($Bi_2(SO_4)_3$), or mixtures of the aforesaid compounds.

It is to be understood that the sulfur-bearing inorganic compounds to be used as stabilizers in this invention are operative compounds, that is, compounds which are themselves substantially stable to decomposition under ordinary conditions, are available in more than rare amounts, or are capable of being isolated from the media in which they were observed, and have a stabilizing affect on sulfur dichloride. In addition, the stabilizer should be soluble or capable of suspension in or in admixture with sulfur dichloride to the extent of the amount used in stabilizing the sulfur dichloride. Preferred groups of stabilizers useful in the process of this invention are those inorganic compounds containing only phosphorus, sulfur and chlorine, inorganic compounds containing only phosphorus, sulfur and oxygen, and inorganic compounds containing only phosphorus, sulfur, oxygen and chlorine.

The sulfur-bearing compound is admixed with impure sulfur dichloride in a proportion between about 0.2 and about 1.2 percent and preferably between 0.3 and about 0.6 percent by weight of the impure sulfur dichloride. If the proportion of the sulfur-bearing compound is less than about 0.2 percent by weight, the stabilizing effect upon the final product is markedly reduced. A proportion of the sulfur-bearing compound in excess of about 1.2 percent has a stabilizing effect, but may unnecessarily adulterate the final product.

Impure sulfur dichloride admixed with a sulfur-bearing stabilizer in the above described proportion is then fractionally distilled to produce a substantially pure highly concentrated sulfur dichloride product. Distillation is effected in a conventional distillation apparatus comprised of a pot, column, condenser, reflux means, condensate receiver, and venting means. The column is provided with sufficient plates or packing, such as Berl saddles, to provide at least about two and one-half theoretical transfer units or plates.

In starting up the fractional distillation operation, the mixture of impure sulfur dichloride and sulfur-bearing stabilizer is charged into the distillation pot and heated to boiling. The boiling temperature of the pot liquor is initially about sixty degrees centigrade, but this temperature gradually increases as the distillation progresses. It is convenient to discontinue the distillation when the pot temperature rises above about one hundred and thirty-five degrees centigrade, leaving a small portion of the sulfur dichloride in the pot residue for subsequent recovery.

The vapor or gas phase produced during the distillation step is divided into two fractions on the basis of temperature. The first fraction, or foreshot, is the vapor discharged from the top of the column at a vapor temperature of below about fifty degrees centigrade, and preferably below about fifty-five degrees centigrade. The foreshot is a mixture of sulfur dichloride and chlorine and comprises generally less than about five percent by weight of the initial charging stock. The foreshot is collected and may be recycled for use in chlorinating sulfur and/or sulfur monochloride to prepare crude sulfur dichloride.

The second vapor fraction, or concentrate fraction, is the vapor leaving the top of the column at a vapor temperature of between about fifty and about seventy-five degrees centigrade, and preferably, between about fifty-five and about sixty-five degrees centigrade. The purest product is generally obtained at a vapor temperature between about fifty-eight and sixty degrees centigrade. This fraction is liquefied by cooling in the condenser to a temperature below the boiling point, and preferably to a temperature between about thirty and about fifty degrees centigrade. One portion of the resulting condensate is recycled to the top of the column for reflux and the other portion, which is sulfur dichloride in a highly concentrated form, is conveyed to the condensate receiver. A reflux ratio (recycle:product) of between about 1:2 and about 1:4 is preferably employed.

When the vapor temperature at the top of the column rises above about seventy-five degrees centigrade, and preferably above about sixty-five degrees centigrade, the distillation is stopped. Although the distillation is controlled by the vapor temperature, it is desirable to stop the distillation when the pot residue reaches a temperature of about one hundred and thirty-five degrees centigrade, and preferably about one hundred degrees centigrade. Pot temperatures above about one hundred and thirty-five degrees centigrade should be avoided because of the relatively high proportion of sulfur monochloride vaporized at such temperatures. The pot residue, which is predominantly sulfur monochloride may be recycled to the chlorination step wherein sulfur monochloride is chlorinated to produce impure sulfur dichloride in accordance with prior art techniques.

The concentrated sulfur dichloride condensate collected in the condensate receiver is preferably admixed with an additional amount of the aforesaid sulfur-bearing stabilizer, the proportion of sulfur-bearing stabilizer being equivalent to between about 0.2 and about 1.2 percent, and preferably between 0.3 and about 0.6 percent by weight of the sulfur dichloride condensate. The resulting mixture, which is highly concentrated sulfur dichloride containing less than about five percent sulfur monochloride, may be stored for almost three months without significant loss of chlorine or other decomposition.

It will be recognized by those skilled in the art that the type of packing, the number of theoretical plates and the reflux ratio employed in the distillation step to give optimum yield of sulfur dichloride may vary with the particular type of distillation apparatus employed. A further modification of the invention is that one type of sulfur-bearing stabilizer may be added prior to distillation, and a different sulfur-bearing stabilizer may be added to the sulfur dichloride concentrate after distillation.

It has been found that when impure sulfur dichloride is distilled in the absence of a sulfur-bearing stabilizer, and then a small portion of a sulfur-bearing stabilizer is admixed with the sulfur dichloride condensate, stabilization of the sulfur dichloride is not readily effected, and improved yields of sulfur dichloride in the distillation step are not attained. Thus, it is essential to the instant invention to carry out the distillation of sulfur dichloride in the presence of the sulfur-bearing stabilizer. It is also desirable to add an additional proportion of sulfur-bearing stabilizer to the sulfur dichloride condensate product produced in the distillation step.

The following examples are presented to explain the invention more completely, without any intention of being limited thereby. All parts and percentages are by weight unless otherwise specified. A crude mixture of sulfur dichloride and sulfur monochloride containing about seventy-five percent sulfur dichloride, prepared by the chlorination of sulfur monochloride in the presence of a ferric chloride catalyst, was used in the following tests.

*Example 1*

Two thousand grams of crude sulfur dichloride were admixed with ten grams of impure thiophosphoryl chloride ($PSCl_3$) having the approximate composition as follows:

| Component: | Proportion, percent |
|---|---|
| $PSCl_3$ | 50 |
| $PCl_3$ | 25 |
| $POCl_3$ | 25 |

Distillation of the resulting mixture was effected in a unit comprised of a distillation pot, a packed column, a condenser, a reflux means, a condensate receiver and a venting means. The distillation pot had a volume of about two liters and was heated by means of a standard laboratory hemispherical electric heating mantle. A Pyrex glass column, three-quarters of an inch in diameter by fifteen inches in height, packed with one-quarter inch Berl saddles, was secured to the top of the distillation pot. The condensate receiver had a volume of about one liter. Temperature measuring means were provided in the pot and in the vapor line at the top of the column.

The treated sulfur dichloride was distilled by heating from ambient temperature to a final pot temperature of about one hundred and thirty degrees centigrade. Three vapor fractions were collected during the distillation step. The foreshot, i.e., vapor produced at a vapor temperature between fifty-one and fifty-five degrees centigrade, was condensed, collected, and weighed. This fraction comprised about 0.70 percent of the charging stock. The vapor having a temperature between fifty-five and seventy-three degrees centigrade was condensed and collected in the condensate receiver, while maintaining a reflux ratio of about 1:3. This fraction, which was concentrated sulfur dichloride, comprised 73.5 percent of the charging stock, indicating a recovery equivalent to about ninety-seven percent of the sulfur dichloride originally present in the feed. Vapors given off at a temperature above seventy-three degrees centigrade were condensed and combined with the pot residue. The combined residue, which was predominantly sulfur monochloride, comprised 24.6 percent of the charging stock. A loss of 1.2 percent of the charging stock during the distillation step was indicated by difference.

The concentrated sulfur dichloride fraction, which weighed one thousand four hundred and ninety-nine grams, was admixed with seven grams of the aforesaid impure thiophosphorylchloride, and stored at room temperature in a closed container. A periodic analysis of the stored material showed no sulfur monochloride present after seventeen days of storage. After fifty-five days of storage, there was 5.8 percent of sulfur monochloride present, and after one hundred and four days storage, only 7.8 percent of the material was sulfur monochloride.

Example 2

The procedure of Example 1 was repeated, employing pure thiophosphoryl chloride stabilizer instead of the impure compound. In this example, the foreshot was collected at a temperature between forty-seven and fifty-five degrees centigrade, and comprised 0.6 percent of the charging stock. The concentrate fraction, i.e., vapors formed at a temperature between fifty-five and sixty-two degrees centigrade, was condensed and collected. This fraction comprised 73.2 percent of the charging stock, indicating a recovery of about 97.5 percent of the sulfur dichloride originally present in the feed. Vapors given off at a temperature above sixty-two degrees centigrade were condensed and combined with the pot residue. This fraction comprised 24.6 percent of the charging stock. A loss of 1.6 percent during the distillation was indicated by difference.

The product fraction, which weighed one thousand four hundred and sixty-eight grams, was admixed with seven grams of pure thiophosphoryl chloride, and stored as in Example 1. After nineteen days storage, the sulfur dichloride contained only 0.9 percent sulfur monochloride, and after fifty-nine days of storage, it contained only 2.1 percent sulfur monochloride.

If thiophosphoryl fluoride ($PSF_3$) is used in place of thiophosphoryl chloride in Examples 1 and 2, similar results would be obtained. Other thiophosphoryl halides which may also exert a stabilizing effect are thiophosphoryl bromide ($PSBr_3$) and thiophosphoryl iodide ($PSI_3$).

Example 3

The procedure of Example 1 was repeated employing phosphorus pentasulfide ($P_4S_{10}$) as the stabilizer. Vapors produced at a temperature between fifty-five and sixty-two degrees centigrade were collected as the concentrate fraction and condensed. This fraction comprised 73.5 percent of the charging stock, indicating a recovery of about ninety-eight percent of the sulfur dichloride originally present in the feed. The combined pot residue and the vapor produced at a temperature above about sixty-two degrees centigrade, after condensing, comprised 25.6 percent of the charging stock. Substantially no vapor was produced at a temperature below fifty-five degrees centigrade. A loss of 0.9 percent of the charging stock was indicated by difference.

The product fraction, which comprised concentrated sulfur dichloride, weighed one thousand four hundred and seventy-eight grams. This fraction was admixed with seven grams of phosphorus pentasulfide, and stored as in Example 1. This material contained only 2.5 percent sulfur monochloride after eighteen days storage and only four percent of the impurity after sixty-seven days storage.

Example 4

The procedure of Example 1 was repeated employing phosphorus sesquisulfide ($P_4S_3$) as the stabilizer. The concentrate fraction was comprised of vapor collected at a vapor temperature of fifty-five to sixty-five degrees centigrade. This fraction comprised seventy-two percent of the charging stock indicating a recovery of ninety-six percent sulfur dichloride originally present in the feed. The combination of the pot residue and the condensed vapor produced at a temperature above about sixty-five degrees centigrade, comprised twenty-six percent of the charging stock. Substantially no vapor was collected at a temperature below fifty-five degrees centigrade. A loss of two percent of the charging stock was indicated by difference.

The concentrate fraction, which weighed one thousand four hundred and forty-two grams, was placed in a closed container without admixing with additional stabilizer, and stored as in Example 1. After fourteen days storage, the product contained 2.6 percent sulfur monochloride, and after sixty-three days' storage contained only 5.7 percent of this impurity.

Example 5

The procedure of Example 1 was repeated employing bismuth sulfide ($Bi_2S_3$) as the stabilizer. The vapor produced at a vapor temperature between fifty-one and sixty-two degrees centigrade, was condensed and collected as the concentrate fraction. This fraction comprised 31.3 percent of the charging stock, indicating a recovery of forty-one percent sulfur dichloride originally present in the feed. The foreshot was collected at temperatures between forty-two and fifty-one degrees centigrade, and comprised 7.9 percent of the charging stock. The combination of the pot residue and condensed vapors produced at a vapor temperature above sixty-two degrees centigrade, comprised 43.6 percent of the charging stock. A loss of 17.2 percent of the charging stock was indicated by difference. The concentrate fraction, which weighed six hundred and twenty-eight grams, was admixed with seven grams of bismuth sulfide, then placed in a closed container, and stored as in Example 1. After nine days' storage the sulfur dichloride contained only 2.5 percent sulfur monochloride, and after forty-five days of storage, it was found to contain 14.4 percent of the impurity.

A comparison of the results of this example with the results of Examples 1–4 indicates that bismuth sulfide is not as effective as the other sulfur-bearing stabilizers from the standpoint of increasing the recovery of sulfur dichloride in the distillation step, but it is effective for stabilizing the product for periods as long as one month. In certain instances, phosphorus-bearing compounds of sulfur cannot be employed as stabilizers, because phosphorus cannot be tolerated as an impurity in subsequent processing steps. In such cases, if bismuth is not detrimental in subsequent processing steps, bismuth sulfide may be employed as an effective stabilizer for sulfur dichloride.

Example 6

The procedure of Example 1 was repeated employing bismuth sulfate ($Bi_2(SO_4)_3$) as the stabilizer.

The concentrate fraction, which weighed 161.73 grams was admixed with eight grams of bismuth sulfate, then placed in a closed container, and stored as in Example 1. After 22 days the product contained about 18 percent sulfur monochloride while the same material without the stabilizer contained about 25 percent sulfur monochloride.

Example 7

For purposes of comparison, phosphorus trichloride was employed as a stabilizer as in the prior art. The procedure of Example 1 was repeated, collecting a concentrate fraction at a vapor temperature between fifty-five and sixty-one degrees centigrade. This fraction, which weighed five hundred and seventeen grams, and which contained ninety-one percent of the sulfur dichloride originally present in the feed, was admixed with three grams of phosphorus trichloride. This mixture was placed in a covered container and stored as in Example 1. After one day the product contained three percent sulfur monochloride, and after thirteen days, it contained eight percent of this impurity.

Thus, it can be seen that the novel stabilizers employed in Examples 1–6 are far superior to phosphorus trichloride from the standpoint of effective stabilizing time. Furthermore, the phosphorus-bearing sulfur compounds employed as stabilizers in Examples 1–4 effected a higher recovery of sulfur dichloride in the distillation step than was obtained when phosphorus trichloride was employed as the stabilizer.

It will be noted that excellent results are obtained when the present invention is used in conjunction with the process disclosed and claimed in my copending patent application S.N. 852,171, filed November 12, 1959, now U.S. 3,071,441, issued January 1, 1963. This application discloses that sulfur dichloride is stabilized with a stabilizing proportion of phosphorus pentachloride. In addition, the process of the present invention may be advantageously used in conjunction with the process disclosed and claimed in my copending application S.N. 852,227, filed on November 12, 1959, now U.S. 3,071,442, issued January 1, 1963. This application discloses that sulfur dichloride is stabilized with a stabilizing proportion of an organic phosphorus compound.

It will be understood that various modifications within the invention are possible, some of which are referred to above. Therefore, I do not wish to be limited except as defined by the appended claims.

I claim:

1. A method of preparing stabilized sulfur dichloride which comprises admixing a phosphorus sulfide with impure sulfur dichloride containing at least about sixty-five percent by weight of sulfur dichloride and less than thirty-five percent by weight of sulfur monochloride, the proportion of said phosphorus sulfide being between about 0.2 and about 1.2 percent by weight of said impure sulfur dichloride, heating said mixture to the boiling point, whereby a vapor is produced, recovering the vapor fraction having a vapor temperature in the range between about fifty and about seventy-five degrees centigrade, cooling said vapor fraction to a temperature at which liquefaction thereof is effected, whereby concentrated sulfur dichloride is produced, and admixing an additional proportion of a phosphorus sulfide with said concentrated sulfur dichloride, said additional proportion being equivalent to between about 0.2 and about 1.2 percent by weight of said concentrated sulfur dichloride, whereby the resulting product is stabilized against decomposition.

2. The method of preparing stabilized sulfur dichloride which comprises admixing sulfur dichloride with a stabilizing proportion of phosphorus sesquisulfide, distilling the resulting mixture and recovering concentrated sulfur dichloride from said distillation step, whereby said concentrated sulfur dichloride is stabilized against decomposition.

3. The method of preparing stabilized sulfur dichloride which comprises admixing sulfur dichloride with a stabilizing proportion of phosphorus pentasulfide, distilling the resulting mixture, recovering concentrated sulfur dichloride from said distillation step, and admixing a stabilizing proportion of phosphorus pentasulfide with said concentrated sulfur dichloride, whereby the resulting product is stabilized against decomposition.

4. The method of preparing stabilized sulfur dichloride which comprises admixing sulfur dichloride with a stabilizing proportion of thiophosphoryl chloride, distilling the resulting mixture, recovering concentrated sulfur dichloride from said distillation step, and admixing a stabilizing proportion of thiophosphoryl chloride with said concentrated sulfur dichloride, whereby the resulting product is stabilized against decomposition.

5. The method of preparing stabilized sulfur dichloride which comprises admixing sulfur dichloride with a stabilizing proportion of phosphorus sesquisulfide, distilling the resulting mixture, recovering concentrated sulfur dichloride from said distillation step, and admixing a stabilizing proportion of phosphorus sesquisulfide with said concentrated sulfur dichloride, whereby the resulting product is stabilized against decomposition.

6. The method of preparing stabilized sulfur dichloride which comprises admixing sulfur dichloride with a stabilizing proportion of bismuth sulfide, distilling the resulting mixture, recovering concentrated sulfur dichloride from said distillation step, and admixing a stabilizing proportion of bismuth sulfide with said concentrated sulfur dichloride, whereby the resulting product is stabilized against decomposition.

7. The method of preparing stabilized sulfur dichloride which comprises admixing sulfur dichloride with a stabilizing proportion of bismuth sulfate, distilling the resulting mixture, recovering concentrated sulfur dichloride from said distillation step, and admixing a stabilizing proportion of bismuth sulfate with said concentrated sulfur dichloride, whereby the resulting product is stabilized against decomposition.

8. The method of preparing stabilized sulfur dichloride which comprises admixing phosphorus pentasulfide with impure sulfur dichloride containing at least about sixty-five percent by weight of sulfur dichloride and less than thirty-five percent by weight of sulfur monochloride, the proportion of said phosphorus pentasulfide being between about 0.2 and about 1.2 percent by weight of said impure sulfur dichloride, heating said mixture to the boiling point whereby a vapor is produced, recovering the vapor fraction having a vapor temperature in the range between about fifty and about seventy-five degrees centigrade, cooling said vapor fraction to a temperature sufficient to effect liquefaction thereof, whereby concentrated sulfur dichloride is produced, and admixing an additional proportion of phosphorus pentasulfide with said concentrated sulfur dichloride, said additional proportion being equivalent to between about 0.2 and about 1.2 percent by weight of said concentrated sulfur dichloride, whereby the resulting product is stabilized against decomposition.

9. The method of preparing stabilized sulfur dichloride which comprises admixing thiophosphoryl chloride with impure sulfur dichloride containing at least about sixty-five percent by weight of sulfur dichloride and less than thirty-five percent by weight of sulfur monochloride, the proportion of said thiophosphoryl chloride being between about 0.2 and about 1.2 percent by weight of said impure sulfur dichloride, heating said mixture to the boiling point whereby a vapor is produced, recovering the vapor fraction having a vapor temperature in the range between about fifty and about seventy-five degrees centigrade, cooling said vapor fraction to a temperature sufficient to effect liquefaction thereof, whereby concentrated sulfur dichloride is produced, and admixing an additional proportion of thiophosphoryl chloride with said concentrated sulfur dichloride, said additional proportion being equivalent to between about 0.2 and about 1.2 percent by weight of said concentrated sulfur dichloride, whereby the resulting product is stabilized against decomposition.

10. The method of preparing stabilized sulfur dichloride which comprises admixing phosphorus sesquisulfide with impure sulfur dichloride containing at least about sixty-five percent by weight of sulfur dichloride and less than thirty-five percent by weight of sulfur monochloride, the proportion of said phosphorus sesquisulfide being between about 0.2 and about 1.2 percent by weight of said impure sulfur dichloride, heating said mixture to the boiling point whereby a vapor is produced, recovering the vapor fraction having a vapor temperature in the range between about fifty and about seventy-five degrees centigrade, cooling said vapor fraction to a temperature sufficient to effect liquefaction thereof, whereby concentrated sulfur dichloride is produced, and admixing an additional proportion of phosphorus sesquisulfide with said concentrated sulfur dichloride, said additional proportion being equivalent to between about 0.2 and about 1.2 percent by weight of said concentrated sulfur dichloride, whereby the resulting product is stabilized against decomposition.

11. The method of preparing stabilized sulfur dichloride which comprises admixing bismuth sulfide with impure sulfur dichloride containing at least about sixty-five percent by weight of sulfur dichloride and less than thirty-five percent by weight of sulfur monochloride, the proportion of said bismuth sulfide being between about 0.2 and about 1.2 percent by weight of said impure sulfur dichloride, heating said mixture to the boiling point whereby a vapor is produced, recovering the vapor fraction having a vapor temperature in the range between about fifty and about seventy-five degrees centigrade, cooling said vapor fraction to a temperature sufficient to effect liquefaction thereof, whereby concentrated sulfur dichloride is produced, and admixing an additional proportion of bismuth sulfide with said concentrated sulfur dichloride, said additional proportion being equivalent to between about 0.2 and about 1.2 percent by weight of said concentrated sulfur dichloride, whereby the resulting product is stabilized against decomposition.

12. The method of preparing stabilized sulfur dichloride which comprises admixing bismuth sulfate with impure sulfur dichloride containing at least about sixty-five percent by weight of sulfur dichloride and less than thirty-five percent by weight of sulfur monochloride, the proportion of said bismuth sulfate being between about 0.2 and 1.2 percent by weight of said impure sulfur dichloride, heating said mixture to the boiling point whereby a vapor is produced, recovering the vapor fraction having a vapor temperature in the range between about fifty and about seventy-five degrees centigrade cooling said vapor fraction to a temperature sufficient to effect liquefaction thereof, whereby concentrated sulfur dichloride is produced, and admixing an additional proportion of bismuth sulfate with said concentrated sulfur dichloride, said additional proportion being equivalent to between about 0.2 and about 1.2 percent by weight of said concentrated sulfur dichloride, whereby the resulting product is stabilized against decomposition.

13. A novel sulfur dichloride composition stabilized against decomposition comprised of sulfur dichloride containing a stabilizing proportion of a phosphorus sulfide.

14. A novel sulfur dichloride composition stabilized against decomposition comprised of sulfur dichloride containing a stabilizing proportion of phosphorus pentasulfide.

15. A novel sulfur dichloride composition stabilized against decomposition comprised of sulfur dichloride containing a stabilizing proportion of thiophosphoryl chloride.

16. A novel sulfur dichloride composition stabilized against decomposition comprised of sulfur dichloride containing a stabilizing proportion of phosphorus sesquisulfide.

17. A novel sulfur dichloride composition stabilized against decomposition comprised of sulfur dichloride containing a stabilizing proportion of bismuth sulfide.

18. A novel sulfur dichloride composition stabilized against decomposition comprised of sulfur dichloride containing a stabilizing proportion of bismuth sulfate.

19. Sulfur dichloride stabilized against decomposition by a content of a stabilizing proportion within the range of 0.2 to 1.2 percent by weight of phosphorus pentasulfide.

20. Sulfur dichloride stabilized against decomposition by a content of a stabilizing proportion within the range of 0.2 to 1.2 percent by weight of thiophosphoryl chloride.

21. Sulfur dichloride stabilized against decomposition by a content of a stabilizing proportion within the range of 0.2 to 1.2 percent by weight of phosphorus sesquisulfide.

22. Sulfur dichloride stabilized against decomposition by a content of a stabilizing proportion within the range of 0.2 to 1.2 percent by weight of a phosphorus sulfide.

References Cited by the Examiner

UNITED STATES PATENTS

| | | | |
|---|---|---|---|
| 961,530 | 6/10 | Quayle | 23—205 |
| 2,363,001 | 11/44 | Hughes | 252—397 X |
| 3,071,441 | 1/63 | Schmadebeck | 23—205 |
| 3,071,442 | 1/63 | Schmadebeck | 23—205 |

MAURICE A. BRINDISI, *Primary Examiner.*

BENJAMIN HENKIN, *Examiner.*